(12) United States Patent
Wohlfrom

(10) Patent No.: US 6,850,376 B2
(45) Date of Patent: Feb. 1, 2005

(54) SCANNER AND METHOD FOR OPERATING A SCANNER

(75) Inventor: Josef Wohlfrom, Oberkochen (DE)

(73) Assignee: Zeiss Optronik GmbH, Oberkochen (DE)

( * ) Notice: Subject to any disclaimer, the term of this patent is extended or adjusted under 35 U.S.C. 154(b) by 0 days.

(21) Appl. No.: 10/637,883

(22) Filed: Aug. 8, 2003

(65) Prior Publication Data

US 2004/0036938 A1 Feb. 26, 2004

(30) Foreign Application Priority Data

Aug. 12, 2002 (DE) .......................................... 102 37 384

(51) Int. Cl.⁷ .............................................. G02B 26/08
(52) U.S. Cl. ..................... 359/896; 359/196; 700/60; 318/628
(58) Field of Search ................................. 359/196–226, 359/896; 356/614, 622; 318/560, 617–618, 628, 638, 640, 671

(56) References Cited

U.S. PATENT DOCUMENTS

| | | | |
|---|---|---|---|
| 3,875,383 A | * 4/1975 | Somerville et al. ........... 700/34 |
| 5,557,156 A | 9/1996 | Elings | |
| 5,627,670 A | * 5/1997 | Minoura et al. ............. 359/212 |
| 5,835,251 A | 11/1998 | Toda et al. | |
| 6,040,567 A | 3/2000 | Neher et al. | |
| 6,107,770 A | 8/2000 | Jackson et al. | |

FOREIGN PATENT DOCUMENTS

| | | |
|---|---|---|
| DE | 197 10 714 C1 | 9/1998 |
| EP | 1 238 745 A2 | 9/2002 |
| JP | 2000356752 A | 12/2000 |
| JP | 2001228414 A | 8/2001 |
| JP | 2002040356 A | 2/2002 |

OTHER PUBLICATIONS

Tietze, Schenk, "Halbleiter–Schaltungstechnik", pp. 1133–1155 and 1272–1283, 11th edition, Springer–Verlag, Berlin/Heidelberg (Germany) and New York (USA), 1999, ISBN 3–540–64192–0.

Iwase, et al. 2002/0125222, Sep. 12, 2002.

* cited by examiner

*Primary Examiner*—James Phan
(74) *Attorney, Agent, or Firm*—Burns, Doane, Swecker & Mathis LLP

(57) ABSTRACT

The invention relates to a scanner, wherein a position of a moveable part of the scanner is adjusted by inputting a command variable which changes repeatedly in the same manner. A command signal corresponding to the command variable is supplied to a controller (3), the controller (3) being constructed for correcting a setpoint deviation in the presence of a command variable which is constant in time. A control error of the controller (3) which arises from the change in the command variable is corrected by evaluating a setpoint deviation of the position of the moveable part or an equivalent variable, obtaining from this a correction signal and changing an output signal of the controller (3) by using the correction signal.

20 Claims, 2 Drawing Sheets

SCANNER AND METHOD FOR OPERATING A SCANNER

Figure 1:
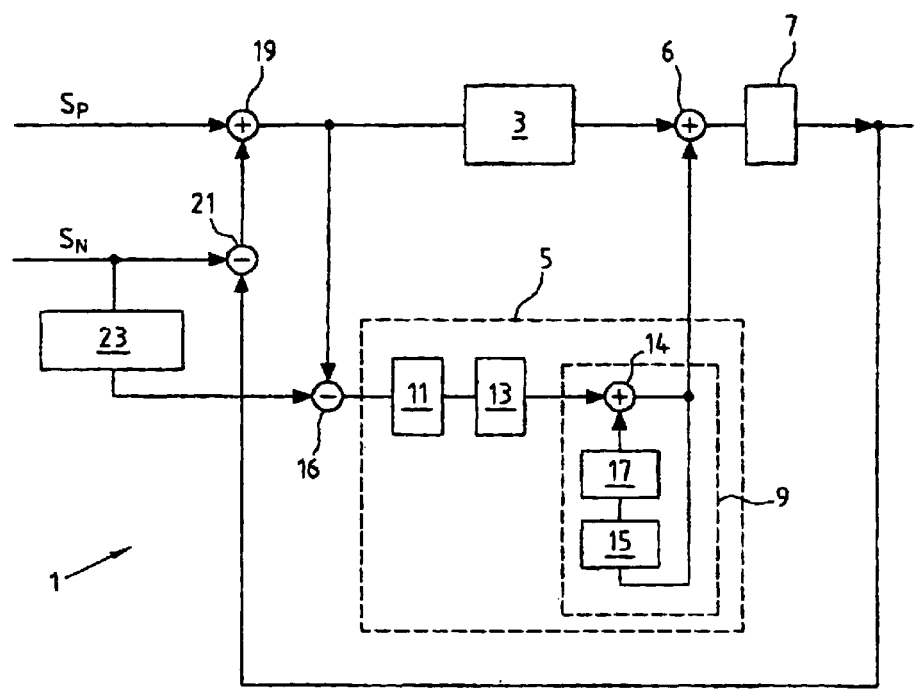

This application claims priority under 35 U.S.C. §§119 and/or 365 to Application No. 102 37 384.1-51 filed in Germany on Aug. 12, 2000; the entire content of which is hereby incorporated by reference.

The invention relates to a scanner with a position control device and a method for operating a scanner.

Scanners are needed, in particular, for obtaining image information and other information of scannable objects or areas, which can be obtained via incident electromagnetic radiation, with different requirements for the accuracy of the scanning process. For relatively irregular scanning, it is sufficient to only control a moveable part of the scanner by inputting a changing command variable. If, however, high accuracy of the scanning process is demanded, it is desirable to determine, and possibly to correct, a setpoint deviation of the position of the moving part. However, such a control system is associated with problems, particularly in the case of scanners.

In the case of scanners, a time variation of at least one command variable is suitably preset and repeated many times in the same manner, particularly at the same time intervals (periodically). Besides, there can be further command variables or changes in the command variable which do not repeat in the same manner, e.g. in order to perform an advance of an actuator between two cycles of the change of the first command variable and/or during a cycle and/or to change an offset of an actuating variable.

Controllers which are designed for correcting a setpoint deviation of a controlled variable in the presence of a command variable which is constant in time only supply satisfactory results at high sampling rates and/or high control gain when the command variable changes with time. However, the control process thus becomes sensitive to parasitic influences and parameter fluctuations of the controlled system, for example due to friction in mechanically moveable parts of the scanner and due to temperature-dependent properties of the controlled system, for example the temperature dependence of electrical resistances of a scanner motor.

A further problem with scanners consists in the fact that the controlled system is inert due to the time constants of the scanner motor and, therefore, responds to an actuating signal only with delay. The controlled system, therefore, has a low-pass characteristic. On the other hand, inverse or approximately inverse models of the controlled system, which, in consequence, would have a high-pass characteristic in the present case, are advantageously used in controllers. This would be associated with high gains of measurement noise in the control loop and other interfering signals.

It is an object of the invention to provide a scanner with a position control device and a method for operating a scanner which enable a scanning process to have high accuracy and regularity. In particular, a command signal is used for the scanning process at least a part of which changes repeatedly in the same manner.

It is proposed to use a controller which is designed for correcting a setpoint deviation of a controlled variable in the presence of a command variable at least a part of which is constant in time, and to combine this with a correction device for correcting a control error of the controller. The correction device corrects the control error of the controller which arises from a change in a setpoint of the controlled variable with time wherein the change is repeated in the same manner.

In the scanner, the controller and the correction device can comprise mutually separate signal inputs in each case for receiving an input signal, the input signals in each case reproducing the setpoint deviation, an equivalent variable or a variable derived from this. It is also proposed that a combination device for combining output signals of the controller and of the correction device is provided, the combination device being connected at an input side to a signal output of the controller and to a signal output of the correction device and at an output side to an actuating device for adjusting a position of a moveable part of the scanner.

In the method according to the invention, the control error of the controller is corrected by evaluating a setpoint deviation of the position of the moveable part or an equivalent variable, obtaining from this a correction signal and changing an output signal of the controller by using the correction signal.

The invention makes it possible to use any controller. This can be a conventional controller which is only designed for correcting a setpoint deviation of a controlled variable in the presence of a command variable which is constant in time. However, the controller can also be a different controller. Furthermore, it is possible, due to the correction of the control error performed outside the controller, to operate with moderate sampling rates, low control gains and/or arbitrary suitable models of the controlled system. The controller can therefore be designed to be insensitive to parasitic influences, parameter fluctuations and/or interfering signals.

It is preferred to evaluate the setpoint deviation over at least one cycle of the change in the command variable and to use a course of the correction signal, obtained from the evaluation, for correcting the control error in at least one later cycle of the change of the command variable. In the case of the scanner, the correction device can comprise for this purpose a finite impulse response (FIR) filter which comprises a signal input which is connected to or is identical to the signal input of the correction device. A plurality of correction values, especially a complete set for a complete cycle, can be stored in a storage device, preferably in a circular buffer.

This embodiment is based on the idea that the control error of a controller which arises from a change in the command variable which is repeated in the same manner can be reproduced. This even approximately applies to the entire control error with controller settings with good damping even when parasitic influences, parameter fluctuations and/or interfering signals occur.

To match, if required, the delay already generated by the FIR filter to the spacing between the cycles, it is proposed to connect a delay element in series with the FIR filter. In the case of periodically repeated cycles, it is sufficient to set or to select a delay time of the delay element once in such a manner that the sum of the two delay times is equal to the length of the period.

Preferably, a second combination device for combining, particularly adding together, an output signal of the storage device and an output signal of a determining device for determining the correction is provided. An input of the second combination device is in each case connected to an output of the storage device and to an output of the determining device, respectively. Furthermore, an output of the second combination device is connected to an input of the storage device. In particular, such an arrangement can be used for improving the correction values from cycle to cycle and to adjust them to any changes in the properties and/or settings of the control system.

If the combination device is constructed as a summing device, this structure can be compared with a digital integrator. In the text which follows, the structure is called a cycle integrator when correction values are stored at least for one complete cycle.

The scanner with cycle integrator has the advantage that periodic sequences of command signals can be converted without errors even when the control system has a nonlinear actuation characteristic, for example due to the fact that the response of the scanner motor depends on the instantaneous position of the motor. Such a nonlinear actuating characteristic is repeated in the same manner in each cycle. Therefore, the corresponding control error can be corrected.

It is preferred, particularly in the case of the cycle integrator but also quite generally if the correction device exhibits an integrating characteristic, that the setpoint deviation is evaluated repeatedly over in each case one cycle of the change of the command variable and, in each case from one of the cycles, correction signals are obtained by means of which the control error can be compensated for only partially, in particular the setpoint deviation can only be reduced to a fraction of the setpoint deviation of the cycle. Due to the integrating characteristic, the remaining control error is reduced further from cycle to cycle.

This arrangement has the advantage that non-periodic interfering signals are only included in the correction in an attenuated manner. Therefore, a compromise between the susceptibility to interference and the speed of the reaction to control errors can be found in the adjustment of the degree of compensation or correction which is to be achieved in the next cycle following. In particular, the degree can be adjusted by adjusting the determining device for determining correction values, e.g. of the FIR filter.

A disadvantage of the correction device having an integrating characteristic consists in that discontinuities in the course of the changing command variable which cannot be corrected due to an actuating limit of the actuating device are continuously increasing at the output of the correction device lead to overloading. To solve this problem, it is proposed to arrange a low-pass filter, particularly a non-causal low-pass filter, between the output of the storage device and the associated input of the second combination device. Such an arrangement leads to a good correction result because the correction values stored in the storage device already originate from a past cycle. Although this cancels the integrating characteristic, an integrating characteristic can be achieved in approximation by means of additional measures, namely by taking into consideration the dynamic range of the controlled system in the generation of the command signals, by numerically precise generation of the command signals and by selecting a weak low-pass effect in the low-pass filter.

A further development of the scanner and of the method for operating a scanner, respectively, relates to the case that a part of the command signal or, respectively, a further command signal at an input of the position control device does not change repeatedly in the same manner. It is proposed to supply this part or, respectively, the further command signal to the controller but not to the correction device. This can be achieved, for example, by arranging an elimination device for eliminating this part or, respectively, this command signal between the input of the position control device and the signal input of the correction device.

In the text which follows, the invention will be explained in greater detail with reference to exemplary embodiments. An exemplary embodiment is shown schematically in FIG. 1 which corresponds to the currently known best mode of the invention.

FIG. 1 shows a control circuit diagram of a position control device with controlled system of a scanner.

Figure 2:
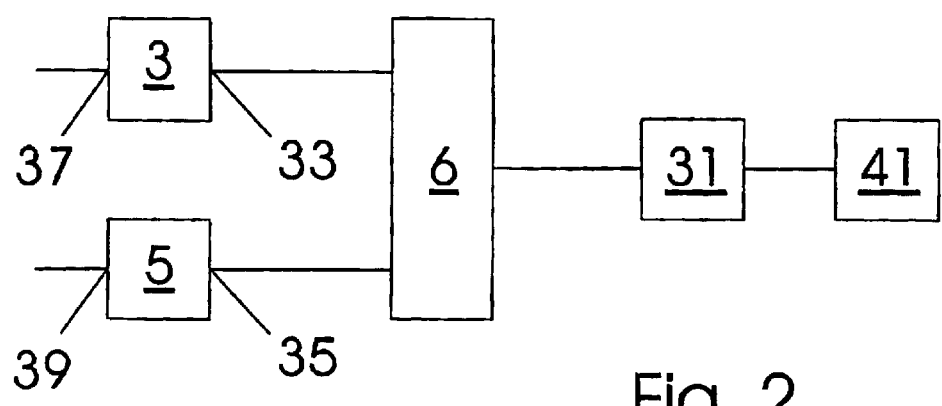

FIG. 2 schematically shows an arrangement with an actuating device.

A periodically changing command signal $S_P$ and a command signal $S_N$ changing in a different manner are present at separate inputs of the position control device 1.

For example, the scanner is arranged on or in a vehicle and is used for generating an infrared image of the environment of the vehicle. For this purpose, the scanner comprises at least one rotatable element for reflecting incident infrared radiation, the position of rotation of which can be adjusted via a motor drive.

In particular, the course of the command signal $S_P$ over time exhibits a sawtooth-like shape with linearly increasing sawtooth edges. In the example, this corresponds to a repeated rotation of the rotatable element with a constant angular velocity over a defined range of angles of rotation.

The command signal $S_N$ is changed and/or applied to the input of the position control device 1 in an unpredictable manner. In the above example, the command signal $S_N$ is used, for example, for compensating movements of the vehicle during the trip so that approximately the same area of the environment of the vehicle continues to be scanned.

The position control device 1 comprises a conventional controller 3. At the input side, the controller 3 is connected to a summing device 19. Between the summing device 19 and the controller 3, there is a branch at which a signal line branches away to a subtraction device 16. The subtraction device 16 is connected to a signal input of a correction device 5.

The input at which the command signal $S_P$ is present is connected to an input of the summing device 19. The input at which the command signal $S_N$ is present is connected to an input of a subtraction device 21. An output of the subtraction device 21 is connected to a further input of the summing device 19. A further input of the subtraction device 21 is connected to a signal output of a controlled system 7 so that an output signal of the position control device 1 can be fed back.

At the input side of the subtraction device 21, there is a branch at which the command signal $S_N$ is branched off in the direction of a filter 23. An output of the filter 23 is connected to a further input of the subtraction device 16.

The correction device 5 comprises a delay element 11, the signal input of which is connected to the signal input of the correction device 5. A signal output of the delay element 11 is connected to an input of a filter 13. The filter 13 is a finite impulse response (FIR) filter in the present exemplary embodiment.

An output of the filter 13 is connected, in turn, to an input of a cycle integrator 9. The cycle integrator 9 comprises a circular buffer 15, a low-pass filter 17 and a summing device 14. The input of the cycle integrator 9 is connected to an input of the summing device 14. A further input of the summing device 14 is connected to an output of the low-pass filter 17. An output of the summing device 14 is connected to a branch at which a signal line branches in the direction of an input of a summing device 6 and in the direction of an input of the circular buffer 15.

The summing device 6 comprises a further input which is connected to an output of the controller 3. An output of the summing device 6 is connected to an input of the controlled system 7.

In the text which follows, the operation of the control process is described:

The output signal of the controlled system 7, fed back from the output of the controlled system 7, is subtracted from the command signal $S_N$ present at the subtraction device 21 at least from time to time. The resultant signal is added to the command signal $S_P$ at the summing device 19. The signal of the addition reproduces the instantaneous setpoint deviation of the controlled system 7. The controller 3 outputs a corresponding actuating signal to the summing device 6.

At the subtraction device 16, an output signal of the filter 23 is subtracted from the signal of the addition. The filter 23 filters the command signal $S_N$ with the transfer function $$F_k=1/(1+F_r{}^*F_u),$$

where $F_r$ is an approximated signal transfer function of the controller 3 and $F_u$ is an approximated signal transfer function of the controlled system 7. Due to the filtering and the subtraction at the subtraction device 16, the command signal $S_N$ is (approximately) eliminated from the signal of the addition as a result. The correction device 5 is, therefore, provided with a correspondingly modified setpoint deviation with only periodic components of the command signals as input signal. The correction signal which can be calculated from this can thus also be used in cycles in which there is no command signal $S_N$ or another command signal $S_N$ present at the input of the position control device 1.

The input signal of the correction device 5 is first delayed in the delay element 11 in such a manner that the total delay achieved at the output of the filter 13 exactly corresponds to the length of a period of the command signal $S_P$. The signal present at the input of the filter 13 can be subjected to various operations in the filter 13. In particular, the amplitude of the signal can be reduced by a constant factor in order to achieve the only partial compensation of the control error, already described above in the general section of the description.

In an alternative embodiment, the delay element is arranged not in front of but behind the filter 13. It is also possible to arrange a plurality of delay elements in front of and/or behind the filter 13.

In the embodiment shown in FIG. 1, a correction signal derived from the setpoint deviation is present at the output of the filter 13. In the second cycle after the beginning of operation or after the position control device 1 has been reset, the correction signal can be directly used for correcting the actuating signal present at the output of the controller 3. In this cycle, the circular buffer 15 is still empty or, respectively, the stored correction values are equal to zero so that the summing device 14 does not perform any change in the output signal of the filter 13.

In the second cycle and in all subsequent cycles, however, correction values corresponding to the output signal of the summing device 14, which are available for correction in subsequent cycles each case and are added to the output signal of the filter 13 after having been filtered in the low-pass filter 17 by the summing device 14, are stored in the circular buffer 15.

The respective output signal of the summing device 14 is supplied to the summing device 6 where it is added to the actuating signal at the output of the controller 3. This results in a corrected actuating signal which is supplied to an actuating device, not shown, of the controlled system 7.

FIG. 2 shows a controller 3 and a correction device 5 which comprise mutually separate signal inputs 37, 39. A combination device 6 is provided for combining output signals of the controller 3 and of the correction device 6. The combination device 6 is connected at an input side to a signal output 33 of the controller 3 and to a signal output 35 of the correction device 5 and at an output side to an actuating device 31 for adjusting a position of a moveable part 41 of a scanner.

What is the claimed is:

1. A scanner having a moveable part and a position control device, wherein the position control device comprises the following:
    a controller which is constructed for correcting a setpoint deviation of a controlled variable, particularly in the presence of a command variable which is constant in time;
    a correction device for correcting a control error of the controller which arises from a change in the setpoint of the controlled variable with time; and
    an actuating device for adjusting a position of a moveable part of the scanner,
    wherein the controller and the correction device comprise mutually separate signal inputs in each case for receiving an input signal, wherein a combination device is provided for combining output signals of the controller and of the correction device to form a combination signal and wherein the combination device is connected at an input side to a signal output of the controller and to a signal output of the correction device and at an output side to the actuating device.

2. The scanner as claimed in claim 1, wherein the correction device comprises a finite impulse response (FIR) filter which comprises a signal input which is connected to or is identical to the signal input of the correction device.

3. The scanner as claimed in claim 2, wherein a delay element is connected in series with the FIR filter between the signal input of the correction device and the signal output of the correction device.

4. The scanner as claimed in claim 3, wherein the correction device comprises a storage device for storing a plurality of correction values for correcting an output variable of the controller.

5. The scanner as claimed in claim 4, which comprises a determining device for determining a correction value and which comprises a second combination device for combining an output signal of the storage device with an output signal of the determining device, wherein in each case an input of the second combination device is connected to an output of the determining device and, respectively, to an output of the storage device and wherein an output of the second combination device is connected to an input of the storage device.

6. The scanner as claimed in claim 5, wherein the determining device is a finite impulse response (FIR) filter which is part of the correction device and which comprises a signal input which is connected to or is identical to the signal input of the correction device.

7. The scanner as claimed in claim 6, wherein a low-pass filter is connected between the output of the storage device and the input, connected thereto, of the second combination device.

8. The scanner as claimed in claim 5, wherein a low-pass filter is connected between the output of the storage device and the input, connected thereto, of the second combination device.

9. The scanner as claimed in claim 1, wherein the correction device comprises a storage device for storing a plurality of correction values for correcting an output variable of the controller.

10. The scanner as claimed in claim 9, which comprises a determining device for determining a correction value and which comprises a second combination device for combining an output signal of the storage device with an output signal of the determining device, wherein in each case an input of the second combination device is connected to an output of the determining device and, respectively, to an output of the storage device and wherein an output of the second combination device is connected to an input of the storage device.

11. The scanner as claimed in claim 10, wherein the determining device is a finite impulse response (FIR) filter which is part of the correction device and which comprises a signal input which is connected to or is identical to the signal input of the correction device.

12. The scanner as claimed in claim 10, wherein a low-pass filter is connected between the output of the storage device and the input, connected thereto, of the second combination device.

13. The scanner as claimed in claim 1, wherein an elimination device for eliminating components of command signals, which do not change repeatedly in the same manner, is connected between a signal input of the position control device for the command signals and the signal input of the correction device.

14. The scanner as claimed in claim 1, wherein the actuating device is connected to the moveable part, so that the actuating device can adjust the position of the moveable part depending on combination signal.

15. A method for operating a scanner, wherein a command variable is used at least a part of which changes repeatedly in the same manner,
wherein a command signal corresponding to the command variable is supplied to a controller,
wherein the controller is constructed for correcting a setpoint deviation in the presence of a command variable which is constant in time and wherein a control error of the controller which arises from the change in the command variable is corrected by
evaluating a setpoint deviation of the position of the moveable part or an equivalent variable;
obtaining from this a correction signal; and
changing an output signal of the controller by using the correction signal;
wherein a position of a moveable part of the scanner is adjusted using the output signal which has been changed by using the correction signal.

16. The method as claimed in claim 15, wherein the setpoint deviation is evaluated over at least one cycle of the change in the command variable and a course, obtained from this, of the correction signal is used for correcting the control error in at least one later cycle of the change in the command variable.

17. The method as claimed in claim 16, wherein the setpoint deviation is repeatedly evaluated over in each case one cycle of the change in the command variable and wherein in each case correction signals by means of which the control error can only be partially compensated, particularly the setpoint deviation can only be reduced to a fraction of the setpoint deviation of the cycle, are obtained from one of the cycles.

18. The method as claimed in claim 15, wherein the correction signal is obtained by a correction device having a correction device signal input which is separate from a controller signal input of the controller for receiving an operating signal and wherein the correction device has a correction signal output for outputting the correction signal.

19. The method as claimed in claim 18, wherein a second part of the command variable or, respectively, a further command variable does not change repeatedly in the same manner and wherein, for correcting the control error of the controller, a signal which corresponds to the second part or, respectively, to the further command variable is used to operate the controller, but is eliminated from a signal which is supplied to the correction device signal input.

20. The method as claimed in claim 15, wherein the scanner is used to obtain information of scannable objects or areas, which are obtained via incident electromagnetic radiation.

* * * * *